United States Patent
Alahyari et al.

(10) Patent No.: US 11,045,912 B2
(45) Date of Patent: Jun. 29, 2021

(54) METHOD OF FABRICATING AN OSCILLATING HEAT PIPE

(71) Applicant: Hamilton Sundstrand Corporation, Charlotte, NC (US)

(72) Inventors: Abbas A. Alahyari, Glastonbury, CT (US); Ram Ranjan, West Hartford, CT (US); Jinliang Wang, Ellington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 9 days.

(21) Appl. No.: 16/444,600

(22) Filed: Jun. 18, 2019

(65) Prior Publication Data

US 2020/0398385 A1    Dec. 24, 2020

(51) Int. Cl.
*B23P 15/26* (2006.01)
*B33Y 80/00* (2015.01)
(Continued)

(52) U.S. Cl.
CPC .............. *B23P 15/26* (2013.01); *B33Y 80/00* (2014.12); *F28D 15/0233* (2013.01);
(Continued)

(58) Field of Classification Search
CPC ................. B23P 15/26; B23P 2700/09; Y10T 29/49353; B33Y 10/00
See application file for complete search history.

(56) References Cited

U.S. PATENT DOCUMENTS 6,269,865 B1 * 8/2001 Huang ................ F28D 15/0266
165/104.26
6,308,775 B1 * 10/2001 Naumann ............... F28F 13/04
165/133
(Continued)

FOREIGN PATENT DOCUMENTS

| CN | 102497764 A | 6/2012 |
| CN | 102628655 B | 4/2013 |
| WO | WO2017052798 A1 | 3/2017 |

OTHER PUBLICATIONS

O. Ibrahim, et al. "An investigation of a multi-layered oscillating heat pipe additively manufactured from Ti-6AI-4V powder", from International Journal of Heat and Mass Transfer 108 (2017) pp. 1036-1047.
(Continued)

*Primary Examiner* — Jason L Vaughan
(74) *Attorney, Agent, or Firm* — Kinney & Lange, P.A.

(57) ABSTRACT

A method of fabricating an oscillating heat pipe includes building the oscillating heat pipe with a layer-by-layer additive manufacturing process such that the oscillating heat pipe includes a body of solid material, an array of channels, an evaporator portion, and a condenser portion. The array of channels are disposed in the body and define a continuous loop through which a fluid flows. The array of channels is formed by cavities in the body as the body is formed with layer-by-layer additive manufacturing. An inner surface of a channel includes a flow directing feature that is configured to promote a first direction of flow and that is configured to provide resistance against a second direction of flow that is opposite the first direction of flow.

12 Claims, 5 Drawing Sheets

(51) Int. Cl.
  *F28D 15/02* (2006.01)
  *B33Y 10/00* (2015.01)
  *B33Y 50/00* (2015.01)

(52) U.S. Cl.
  CPC ........... *B23P 2700/09* (2013.01); *B33Y 10/00* (2014.12); *B33Y 50/00* (2014.12); *Y10T 29/49353* (2015.01)

(56) References Cited

U.S. PATENT DOCUMENTS

| | | | |
|---|---|---|---|
| 10,646,969 B2 * | 5/2020 | Ranjan | F28F 3/02 |
| 2004/0035555 A1 * | 2/2004 | Nara | F28F 13/10 |
| | | | 165/84 |
| 2009/0101308 A1 * | 4/2009 | Hardesty | F28D 15/0233 |
| | | | 165/80.4 |
| 2011/0067843 A1 | 3/2011 | Vasiliev, Jr. | |
| 2012/0279242 A1 * | 11/2012 | Seybold | B60H 1/00342 |
| | | | 62/190 |
| 2014/0165570 A1 | 6/2014 | Herring | |
| 2015/0316326 A1 * | 11/2015 | Choi | F02M 21/0215 |
| | | | 165/166 |
| 2015/0377562 A1 * | 12/2015 | Buckrell | F24F 3/147 |
| | | | 165/181 |
| 2016/0231064 A1 | 8/2016 | Kironn et al. | |
| 2017/0205146 A1 * | 7/2017 | Turney | F28D 7/0033 |
| 2018/0244127 A1 * | 8/2018 | Sennoun | F28D 1/0341 |
| 2018/0266773 A1 | 9/2018 | Hislop | |
| 2018/0283798 A1 | 10/2018 | Kim et al. | |
| 2018/0339329 A1 | 11/2018 | Phillips et al. | |
| 2019/0033013 A1 | 1/2019 | Byfield | |
| 2019/0299206 A1 | 10/2019 | Moura Pires De Andrade Tenreiro et al. | |
| 2020/0158446 A1 * | 5/2020 | Alahyari | B23P 15/26 |

OTHER PUBLICATIONS

Extended European Search Report for EP Application No. 19209676.6, dated Jun. 17, 2020, 7 pages.

* cited by examiner

METHOD OF FABRICATING AN OSCILLATING HEAT PIPE

BACKGROUND

The present disclosure relates to heat pipes. More particularly, the present disclosure relates to heat pipes formed with an additive manufacturing build process.

Heat pipes are passive, two-phase heat transfer devices that can effectively transfer large amounts of thermal energy over large distances, resulting in low thermal resistances. Existing heat pipes consist of channels filled with a two-phase mixture, which acts as the heat transfer medium or working fluid for the system. However, existing configurations of oscillating heat pipes include traditionally manufactured channels that can cause instabilities due to intermittent evaporation and condensation of the working fluid.

SUMMARY

A method of fabricating an oscillating heat pipe includes building the oscillating heat pipe with a layer-by-layer additive manufacturing process such that the oscillating heat pipe includes a body of solid material, an array of channels, an evaporator portion, and a condenser portion. The array of channels are disposed in the body and define a continuous loop through which a fluid flows. The array of channels is formed by cavities in the body as the body is formed with layer-by-layer additive manufacturing. An inner surface of a channel includes a flow directing feature that is configured to promote a first direction of flow and that is configured to provide resistance against a second direction of flow that is opposite the first direction of flow.

An oscillating heat pipe includes a body, an array of channels, an evaporator portion, a condenser portion, a first conduit, and a second conduit. The array of channels is disposed in the body and is formed by cavities in the body as the body is formed with layer-by-layer additive manufacturing. The evaporator portion includes a first end of the array of channels. The condenser portion includes a second end of the array of channels. The first conduit extends from and is fluidly connected to the array of channels. The second conduit extends from and is fluidly connected to the array of channels.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The heat pipe of the present disclosure utilizes additive manufacturing to enable geometries previously not feasible and enhance fluid flow and two-phase heat transfer of the heat pipe.

Figures 1A, 1B:
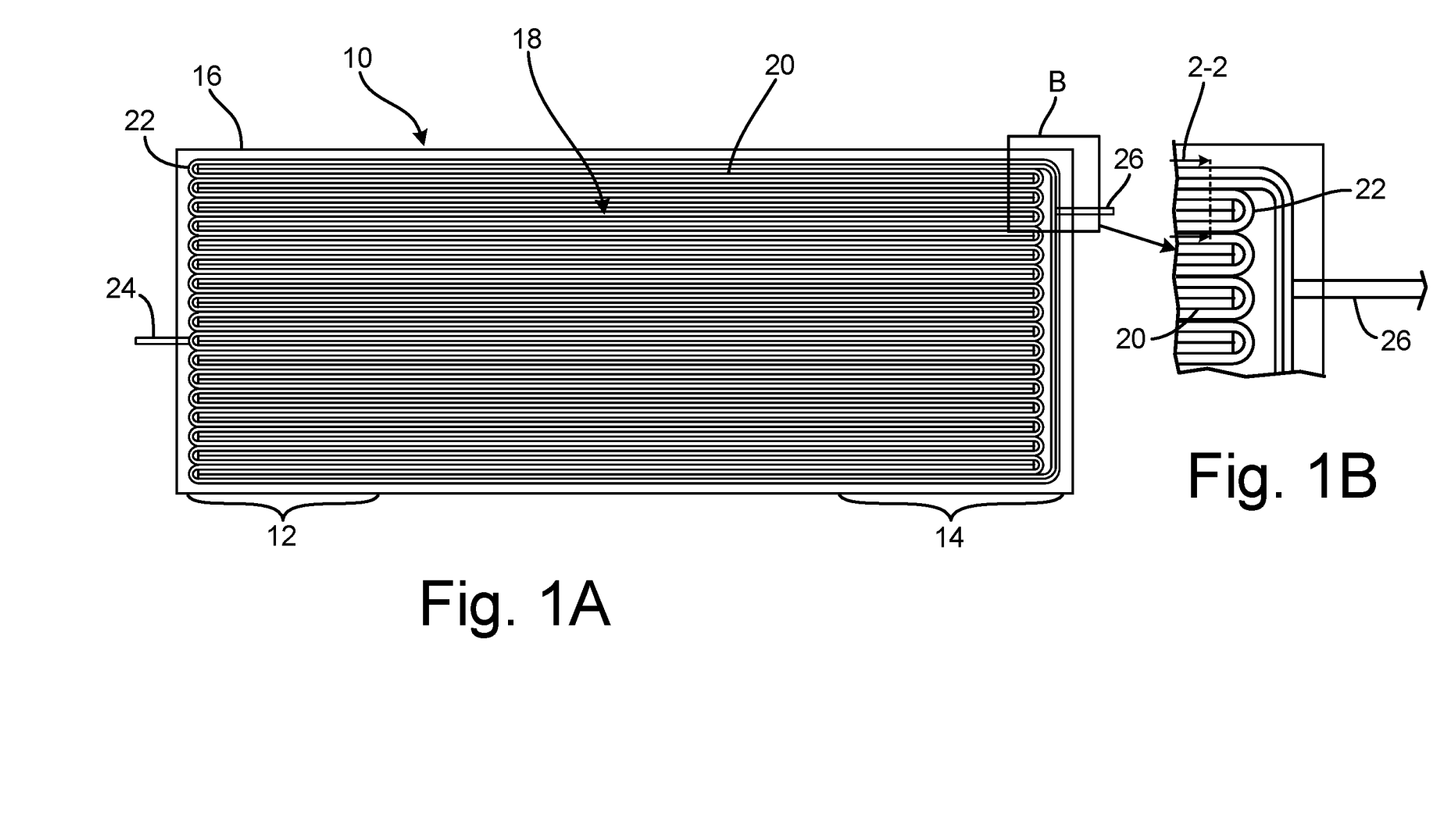
FIG. 1A is a top view of an oscillating heat pipe with an array of channels.
FIG. 1B is a top view of portion B of the oscillating heat pipe shown in FIG. 1.

FIG. 1A is a top view of heat pipe 10 and shows first portion 12, second portion 14, body 16, array 18 of channels 20, (with ends 22), first conduit 24, and second conduit 26. FIG. 1B is a top view of portion B of heat pipe 10 shown in FIG. 1A. For clarity purposes, FIGS. 1A and 1B are discussed in tandem.

Heat pipe 10 is a thermal energy transfer device. In this example, heat pipe 10 is a flat heat pipe plate defining a serpentine passage the forms an oscillating heat pipe. First portion 12 and second portion 14 are areas of heat pipe 10. Body 16 is a block of solid material. Body 16 is formed at least partially of a highly thermally conductive material such as a metal like titanium or aluminum. Array 18 is a series of channels 20. Channels 20 are openings or passages configured to transport a fluid. In this example, a size of the opening for each of channels 20 can be less than or equal to 1 millimeter (0.039 inches). As will be discussed with respect to FIGS. 2A through 2G, channels 20 can include many different cross-sectional shapes. Ends 22 are relative endpoints of channels 20. In this example, ends 22 are ends of linear portions of channels 20. As can be seen in FIG. 1B, ends 22 of channels 20 are curved portions of channels 20. First conduit 24 and second conduit 26 are tubes or pipes configured to transport a fluid.

In this example, heat pipe 10 is formed by a layer-by-layer additive manufacturing process. In one non-limiting embodiment, heat pipe 10 can be formed with a metallic material via a directed energy deposition and/or powder bed fusion process. For example, the additive manufacturing process can include binder jet printing, electron beam melting, selective laser sintering, selective laser melting, direct metal laser sintering, powder-fed directed-energy deposition, laser-based wirefeed, and/or other additive manufacturing processes involving metallic material(s). In another non-limiting embodiment, heat pipe 10 can be formed with a polymer material via fused filament fabrication, photopolymerization, or powder sintering. For example, the additive manufacturing process can include stereolithography, digital light processing, continuous liquid interface production, binder jet printing, selective heat sintering, selective laser sintering, and/or other additive manufacturing processes involving polymer material(s). In some examples, the polymer material can be optically transparent, translucent, or opaque. In such an example, heat pipe 10 formed with an optically transparent, translucent, or opaque polymer material can be used with or as part of a photonic device.

In another example, the polymer material can include a filler material of thermally conductive material, such that the thermal conductivity of heat pipe 10 is enhanced. For example, the filler material can include a conductivity that is less than or greater than the material of body 16 of heat pipe 10. The filler material can be introduced into portions of heat pipe 10 during or after the additive manufacturing process of forming heat pipe 10 (e.g., liquid or solid inserts of filler material can be added to body 16).

In one example, heat pipe 10 can be incorporated into a component of a gas turbine engine. First portion 12 is a segment of heat pipe 10 and is located on an opposite end of heat pipe 10 from second portion 14. First portion 12 and second portion 14 are fluidly connected via channels 20. Array 18 of channels 20 is disposed in body 16. In this example, array 18 of channels 20 is formed by cavities in body 16 as body 16 is formed with the layer-by-layer additive manufacturing process. In this example, array 18 of channels 20 includes a plurality of linear channels oriented parallel to each other. Ends 22 are connected to channels 20 and also fluidly connect separate linear portions of channels 20 together. First conduit 24 extends from body 16 and is fluidly connected to array 18 of channels 20. Second conduit 26 extends from body 16 and is fluidly connected to array 18 of channels 20.

Heat pipe 10 is an oscillating heat pipe that functions as a passive, two-phase heat transfer device that can transfer large amounts of thermal energy over large distances, resulting in low thermal resistances. Channels 20 are filled with a two-phase mixture (e.g., such as a saturated liquid), which acts as the heat transfer medium and working fluid for heat pipe 10. During operation, heat pipe 10 transfers thermal energy by evaporating a portion of the working fluid at first portion 12, which is operating in this example as an evaporator of heat pipe 10. The working fluid evaporates at first portion 12 into slugs of vapor that move (due to capillary force and pressure differentials of the fluid) towards second portion 14, which is operating in this example as a condenser of heat pipe 10. At second portion 14, the slugs of vapor condense and become slugs of liquid. These slugs of vapor and liquid pulsate back and forth between first portion 12 and second portion 14 due to instabilities in the flow and variations between channels 20 of array 18.

Body 16 houses and supports array 18 of channels 20. Ends 22 fluidly connected channels 20 together such that array 18 of channels 20 forms a continuous loop through which a fluid can flow. By way of forming a continuous loop, a continuous circulation of fluid flows through channels 20 of array 18, which enhances thermal energy transfer to and from the working fluid as well as making the performance of heat pip 10 more predictable.

In one example, secondary powder supporting material embedded in channels 20 may be required during the additive manufacturing process. After heat pipe 10 is completed, this secondary powder supporting material needs to be cleaned out. To account for this, first conduit 24 and second conduit 26 can function by inserting pressurized air through first conduit 24 and into array 18 of channels 20. The pressurized air is then drawn out of array 18 of channels 20 and out through second conduit 26. In so doing, the pressurized air cleans particulates from array 18 of channels 20 that may have been left behind due to residually formed material from the additive manufacturing build process of heat pipe 10.

In another example, first conduit 24 and second conduit 26 function by removing air from array 18 of channels 20 through first conduit 24 to draw a vacuum in array 18 of channels 20. A liquid is then inserted through second conduit 26 and into array 18 of channels 20 to charge array 18 of channels 20 with the liquid. Due to the small sizing of channels 20, heat pipe 10 with array 18 of channels 20 would be very difficult to fabricate using traditional manufacturing methods. Forming heat pipe 10 with array 18 of channels 20 with layer-by-layer additive manufacturing enables very small sizes of channels 20 as well as the ability to connect channels 20 with ends 22 on very small sizing scales (e.g., sub-millimeter).

Figure 2A:
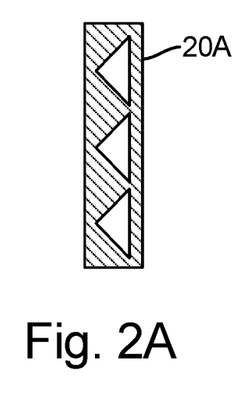
FIG. 2A is a cross-section view of channels of the array of channels according to a first embodiment.
Figure 2B:
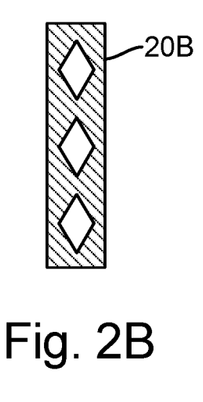
FIG. 2B is a cross-section view of channels of the array of channels according to a second embodiment.
Figure 2C:
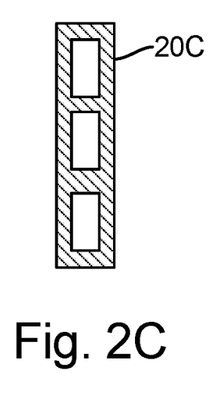
FIG. 2C is a cross-section view of channels of the array of channels according to a third embodiment.
Figure 2D:
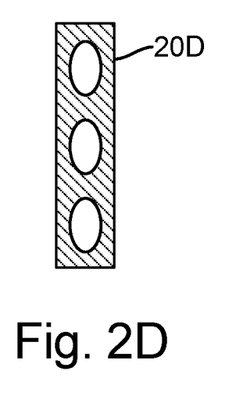
FIG. 2D is a cross-section view of channels of the array of channels according to a fourth embodiment.
Figure 2E:
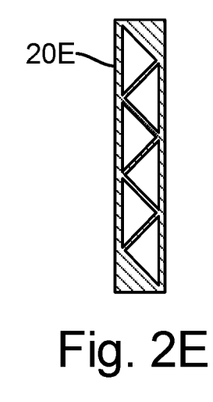
FIG. 2E is a cross-section view of channels of the array of channels according to a fifth embodiment.
Figure 2F:
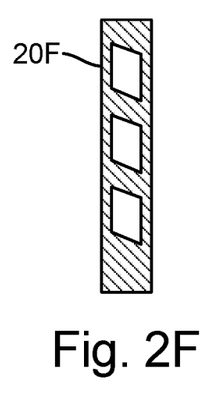
FIG. 2F is a cross-section view of channels of the array of channels according to a sixth embodiment.
Figure 2G:
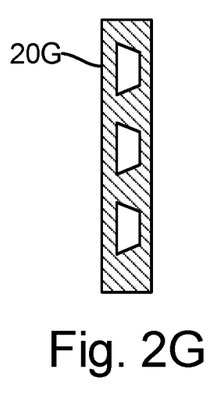
FIG. 2G is a cross-section view of channels of the array of channels according to a seventh embodiment.

FIGS. 2A-2G illustrate various examples of channels 20 shown from the view taken along section line 2-2 in FIG. 1B. FIG. 2A is a cross-section view of channels 20A, which include a triangle cross-sectional shape. FIG. 2B is a cross-section view of channels 20B, which include a diamond (or rhombus) cross-sectional shape. FIG. 2C is a cross-section view of channels 20C, which include a rectangle cross-sectional shape. FIG. 2D is a cross-section view of channels 20D, which include an elliptical cross-sectional shape. FIG. 2E is a cross-section view of channels 20E, which include a triangle cross-sectional shape and an opposing two-tier configuration. FIG. 2F is a cross-section view of channels 20F, which include a parallelogram cross-sectional shape. FIG. 2G is a cross-section view of channels 20G, which include a trapezoid (e.g., isosceles trapezoid) cross-sectional shape.

Channels 20A-20G provides examples of cross-sectional shapes that can be incorporated, alone or in combination, into array 18 of channels 20. Channels 20A-20G enable variations in channels 20 to improve and tailor the thermal energy transfer characteristics of heat pipe 10 based on performance requirements of heat pipe 10.

Figure 3A:
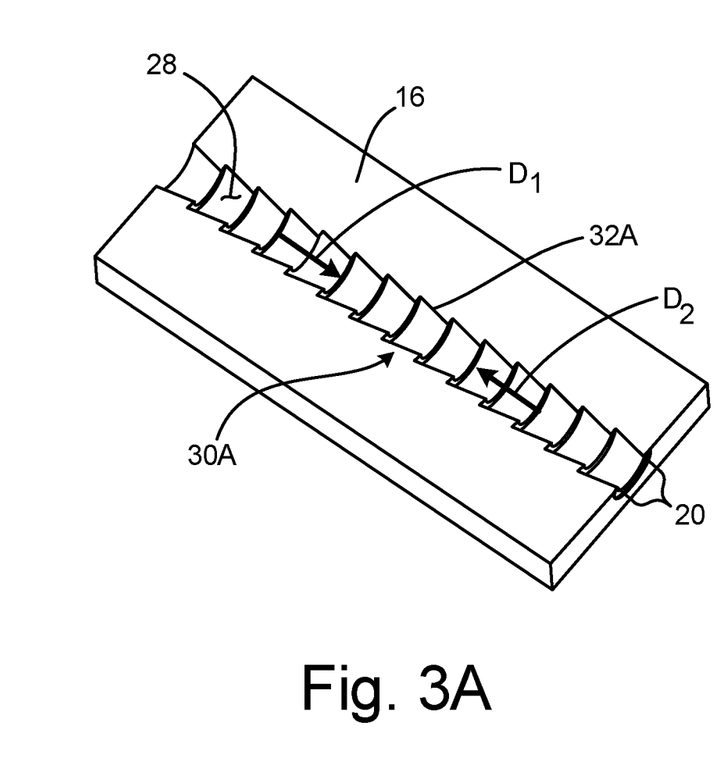
FIG. 3A is a perspective cross-section view of a channel of the array of channels that includes a first series of flow directing features.
Figure 3B:
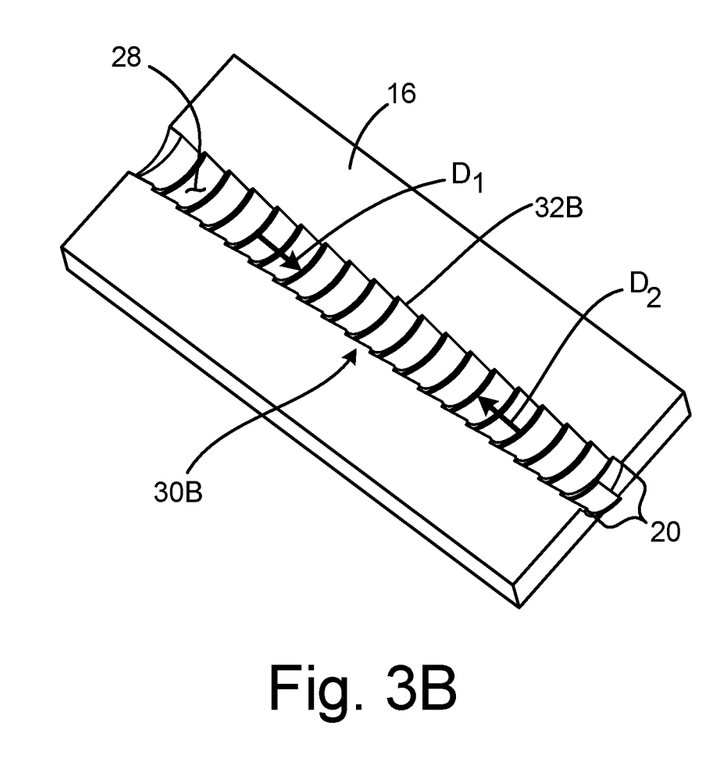
FIG. 3B is a perspective cross-section view of a channel of the array of channels that includes a second series of flow directing features.

FIG. 3A is a perspective cross-section view of a portion of body 16 with channel 20 that shows inner surface 28 (of channel 20) and first flow directing feature 30A with ribs 32A. FIG. 3B is a perspective cross-section view of a portion of body 16 with channel 20 that shows inner surface 28 (of channel 20) and second flow directing feature 30B with helix 32B. For clarity purposes, FIGS. 3A and 3B are discussed in tandem.

Inner surface 28 is an interior surface of channel 20. Flow directing features 30A and 30B are shaped cut-outs or indentations. Ribs 32A are a series of frusto-conical cut-outs. Helix 32B is a helically shaped cut-out (e.g., in the form of a conical helix with a uniform inner diameter along its length and a uniform outer diameter along its length). In other examples, flow directing features 30A and/or 30B can include different features that are embedded into heat pipe 10 as part of the additive manufacturing process. For example, a check valve can be built into one of channels 20 (e.g., a floating ball) that shuts off a flow of the working fluid in one direction but not in the opposite direction. In other examples, a flap or a reed valve can be built into heat pipe 10 that affects the flow of the working fluid through array 18 of channels 20.

Flow directing features 30A and 30B are formed or depressed into inner surface 28 of channel 20. Ribs 32A are positioned sequentially and in a repeating pattern along inner surface 28 of channel 20. Helix 32B is disposed along inner surface 28 of channel 20. Ribs 32A and helix 32B of flow directing features 30A and 30B, respectively, preferentially direct a direction of flow of the working fluid along first direction $D_1$. Conversely, ribs 32A and helix 32B of flow directing features 30A and 30B provide resistance against second direction $D_2$ of a flow of the working fluid that is opposed to the direction of first direction $D_1$. These configurations of flow directing features 30A and 30B promote the flow of the working fluid along first direction $D_1$ and impede or slow to flow of the working fluid in second direction $D_2$.

Utilizing flow directing features 30A and 30B in heat pipe 10 allows for the promotion or increased amounts of flow of the working fluid in desirable directions throughout array 18 of channels 20 which helps to enhance performance and encourage a continuous circulation in one direction throughout heat pipe 10.

Figure 4A:
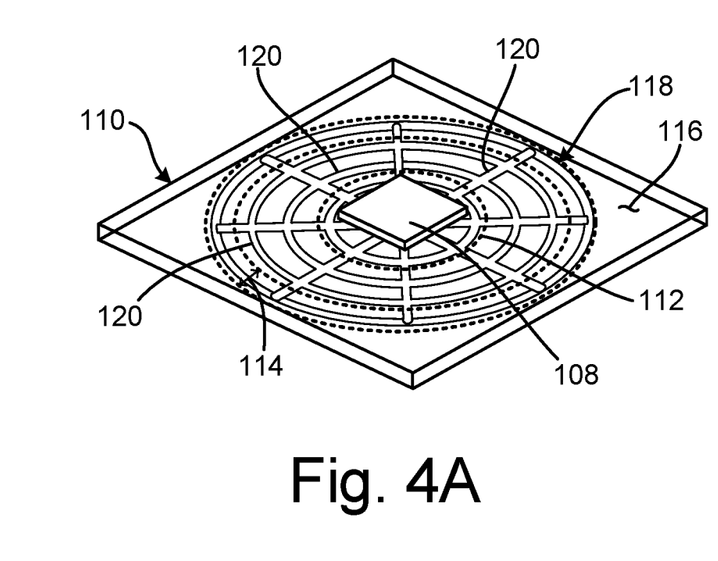
FIG. 4A is a perspective view of an oscillating heat pipe with a concentric array of channels.

FIG. 4A is a perspective view of heat source 108 attached to heat pipe 110 and shows first portion 112, second portion 114, body 116, and array 118 of channels 120.

Heat source 108 is a piece of solid material. In some non-limiting embodiments, heat source 108 can include an electronic component such as a chip. Heat pipe 110 is a thermal energy transfer device. In this example, heat pipe 110 is an oscillating heat pipe. First portion 112 and second portion 114 are different areas of heat pipe 110. Body 116 is a block of solid material. In this example, a material of body 116 is metallic, and can include metals such as titanium or aluminum. Array 118 is a series of channels 120. Channels 120 are openings or passages configured to transport a fluid.

Heat source 108 is attached or mounted to an exterior surface of heat pipe 110. In one non-limiting embodiment, electrical leads/wires can be connected to heat source 108. In this example, a centerpoint of heat source 108 is approximately aligned with a centerpoint of heat pipe 110. In other examples, the centerpoints of heat source 108 and heat pipe 110 can be out of alignment. First portion 112 is a radially inward portion of array 118 of channels 120. In this example, first portion 112 includes an evaporator portion of heat pipe 110. Second portion 114 is a radially outward portion of array 118 of channels 120. In this example, second portion 114 includes a condenser portion of heat pipe 110. Array 118 of channels 120 is disposed inside of body 116.

In this example, array 118 of channels 120 includes a series of concentric circular channels, with a plurality of radially extending linear channels 120 fluidly connecting the series of concentric circular channels. In another example, array 118 of channels 120 can include non-concentrically aligned circular channels, as well as a series of non-circular (e.g., polygonal or elliptical) shaped channels either coaxially/concentrically or non-coaxially/non-concentrically arranged. In another example, array 118 can include a single channel 120 with a spiral configuration, or a bi-spiral configuration with once spiral flowing the working fluid in an outward direction and the other spiral transporting the working fluid inward. In another example, the flow directing features 28A and/or 28B shown in FIGS. 3A and 3B can be included along any portion(s) of channels 120 in array 118. Likewise, any of channels 20A-20G alone or in combination, can be incorporated into array 118 of channels 120.

During operation, heat source 108 has a higher amount of thermal energy than heat pipe 110. Heat pipe 110 functions to draw thermal energy from heat source 108. As thermal energy is transferred from heat source 108 to heat pipe 110, a portion of the working fluid located in first portion 112 absorbs thermal energy and is evaporated. As the working fluid evaporates at first portion 112, the working fluid is drawn radially outward through body 116 towards second portion 114 via array 118 of channels 120. For example, heat pipe 110 is operating as a heat spreader by spreading thermal energy received from heat source 108 across the larger area of heat pipe 110 so as to increase the dissipation rate of thermal energy. Put another way, heat pipe 110 with array 118 of channels 120 takes local high concentration of thermal energy from heat source 108 and spreads the thermal energy across a larger area (of heat pipe 110).

As with heat pipe 10, first portion 112 acts as an evaporator portion of heat pipe 110. Likewise, second portion 114 acts as a condenser portion of heat pipe 110. Channels 120 transport the working fluid from first portion 112 of array 118 to second portion 114 of array 118. In another example, one or more of channels 120 can include flow directing features such as flow directing features 30A and 30B shown in FIGS. 3A and 3B. In heat pipe 110, flow directing features can be positioned along either of the circular channels or the linear channels of array 118 to direct or promote a direction of flow of the working fluid. For example, one set of flow directing features can preferentially direct the working fluid to flow away from first portion 112 and towards second portion 114. Meanwhile, a second set of flow directing features can preferentially direct the working fluid to flow away from second portion 114 and towards first portion 112.

Figure 4B:
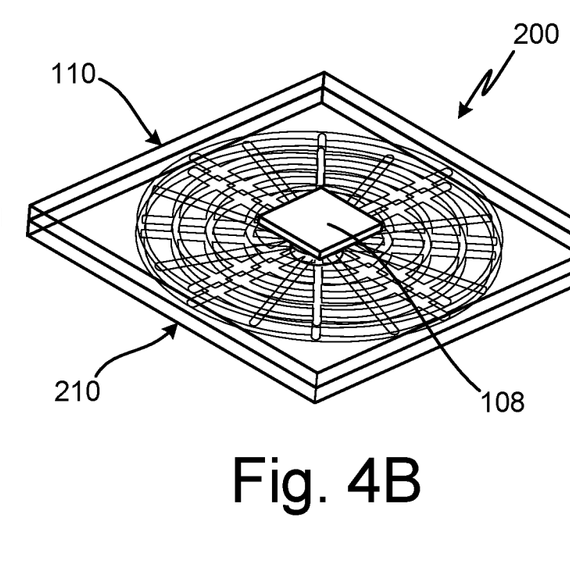
FIG. 4B is a perspective view of an oscillating heat pipe system with two heat pipes.

FIG. 4B is a perspective view of oscillating heat pipe system 200 with heat source 108, heat pipe 110, and heat pipe 210. FIG. 4B shows an example of a heat pipe system with multiple heat pipes attached together to effectuate an increase in volume and area of the arrays of channels through which the working fluid(s) can operate.

For example, heat pipe 110 and heat pipe 210 can be fluidly connected to each other. In another example, heat pipe 110 and heat pipe 210 are not in fluid communication. Here, two heat pipes are shown, but more than two heat pipes can be utilized in tandem in other non-limiting embodiments. Heat system 200 with heat pipe 110 and heat pipe 210 enables additional performance and increased amounts of thermal energy that is drawn away from heat source 108 and dissipated by heat system 200 than by a single heat pipe.

Figure 5:
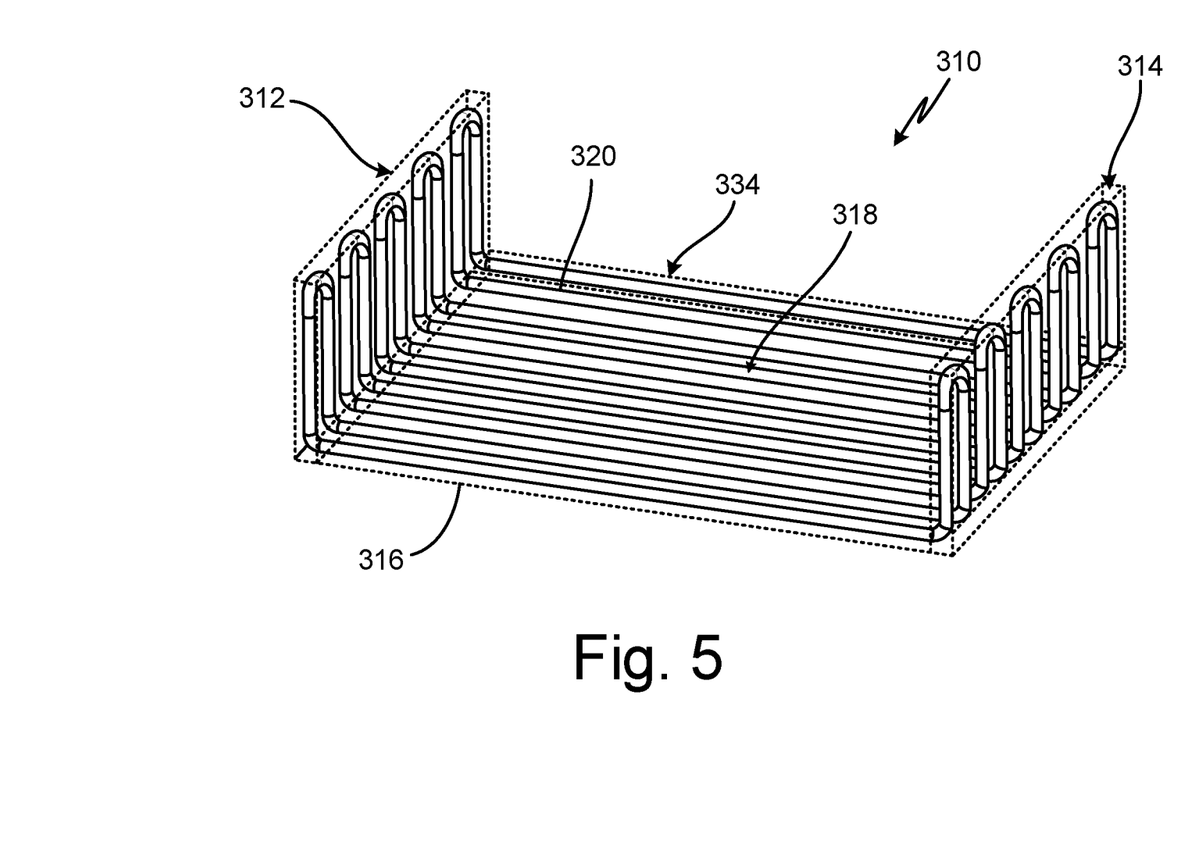
FIG. 5 is a perspective view of an oscillating heat pipe with first and third portions situated perpendicular to a second portion.

FIG. 5 is a perspective view of heat pipe 310 and shows first portion 312, second portion 314, body 316, array 318 of channels 320, and third portion 334.

Third portion 334 is a middle portion of heat pipe 310 that is positioned between first portion 312 and second portion 314. FIG. 5 with heat pipe 310 shows first portion 312 and second portion 314 situated perpendicular to third portion 334. For example, first portion 312 extends along a first plane, second portion extends along a second plane, and third portion 334 extends along a third plane. The first plane of first portion 312 is perpendicular to the third plane of third portion 334. Also, the second plane of second portion 314 is perpendicular to the third plane of third portion 334. Additionally, the first plane of first portion 312 is parallel to the second plane of second portion 314. In other examples, first portion 312, second portion 314, and/or third portion 334 can extend in directions and at angles such that first portion 312, second portion 314, and/or third portion 334 are not perpendicular and/or parallel to one another.

The three-dimensional configuration of heat pipe 310, which is enabled by layer-by-layer additive manufacturing, allows for transfer of thermal energy across multiple planes and across a range of heights that are not possible with existing two-dimensional heat pipes.

Discussion of Possible Embodiments

A method of fabricating an oscillating heat pipe includes building the oscillating heat pipe with a layer-by-layer additive manufacturing process such that the oscillating heat pipe includes a body of solid material, an array of channels, an evaporator portion, and a condenser portion. The array of channels are disposed in the body and define a continuous loop through which a fluid flows. The array of channels is formed by cavities in the body as the body is formed with layer-by-layer additive manufacturing. An inner surface of a channel includes a flow directing feature that is configured to promote a first direction of flow and that is configured to provide resistance against a second direction of flow that is opposite the first direction of flow.

The method of the preceding paragraph can optionally include, additionally and/or alternatively, any one or more of the following steps, features, configurations and/or additional components.

A first conduit can extend from and/or fluidly connect to the array of channels and/or a second conduit can be formed to extend from and/or fluidly connect to the array of channels.

Pressurized air can be inserted through the first conduit and/or into the array of channels after the oscillating heat pipe is built, and/or the pressurized air can be drawn out of the array of channels and/or out through the second conduit, wherein the pressurized air can clean particulates from the array of channels.

Air can be removed from the array of channels through the first conduit to draw a vacuum in the array of channels, and/or a liquid can be inserted into the array of channels through the second conduit to charge the array of channels.

The flow directing feature can comprise a cut-out with a frusto-conical shape.

The flow directing feature can comprise a cut-out with a helical shape.

The array of channels can be formed to comprise a series of concentric circles of channels, wherein the first end of the array of channels can comprise a radially inward portion of the array of channels, wherein the second end of the array of channels can comprise a radially outward portion of the array of channels.

A material of the body can comprise a metal.

The additive manufacturing process can comprise a directed energy deposition or a powder bed fusion process.

The additive manufacturing process can comprise a fused filament fabrication, a photopolymerization, or a powder sintering process.

A material of the body can comprise a polymer.

The material of the body can comprise an optically transparent, an optically, translucent, or an optically opaque polymer material.

An oscillating heat pipe includes a body, an array of channels, an evaporator portion, a condenser portion, a first conduit, and a second conduit. The array of channels is disposed in the body and is formed by cavities in the body as the body is formed with layer-by-layer additive manufacturing. The evaporator portion includes a first end of the array of channels. The condenser portion includes a second end of the array of channels. The first conduit extends from and is fluidly connected to the array of channels. The second conduit extends from and is fluidly connected to the array of channels.

The oscillating heat pipe of the preceding paragraph can optionally include, additionally and/or alternatively, any one or more of the following features, configurations and/or additional components.

An inner surface of a channel of the array of channels can comprise a flow directing feature that can be configured to promote a first direction of flow of the fluid through the channel and/or that can be configured to provide resistance against a second direction of flow that is opposite the first direction of flow.

The flow directing feature can comprise a cut-out with a frusto-conical shape.

The flow directing feature can comprise a cut-out with a helical shape.

The array of channels can comprise a series of concentric circles of channels.

The first end of the array of channels can comprise a radially inward portion of the array of channels, wherein the second end of the array of channels can comprise a radially outward portion of the array of channels.

The array of channels can comprise a plurality of linear channels oriented parallel to each other.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating an oscillating heat pipe via layer-by-layer additive manufacturing, the method comprising:
   creating an electronic file defining the oscillating heat pipe in layers;
   building the oscillating heat pipe with an additive manufacturing process in which the oscillating heat pipe is built layer-by-layer, wherein the oscillating heat pipe comprises:
      a body;
      an array of channels that define a continuous loop through which a fluid flows, the array of channels being disposed in the body, wherein an inner surface of a channel of the array of channels comprises a flow directing feature that is configured to promote a first direction of flow of the fluid through the channel and that is configured to provide resistance against a second direction of flow that is opposite the first direction of flow;
      an evaporator portion that includes a first end of the array of channels; and
      a condenser portion that includes a second end of the array of channels,
   wherein the array of channels is defined by cavities in the body as the body is formed with layer-by-layer additive manufacturing.

2. The method of claim 1, wherein building the oscillating heat pipe comprises:
   forming a first conduit extending from and fluidly connected to the array of channels; and
   forming a second conduit extending from and fluidly connected to the array of channels.

3. The method of claim 2, further comprising:
   inserting pressurized air through the first conduit and into the array of channels after the oscillating heat pipe is built;
   drawing the pressurized air out of the array of channels and out through the second conduit, wherein the pressurized air cleans particulates from the array of channels.

4. The method of claim 2, further comprising:
   removing air from the array of channels through the first conduit to draw a vacuum in the array of channels; and
   inserting a liquid into the array of channels through the second conduit to charge the array of channels.

5. The method of claim 1, wherein the flow directing feature comprises a cut-out with a frusto-conical shape.

6. The method of claim 1, wherein the flow directing feature comprises a cut-out with a helical shape.

7. The method of claim 1, wherein building the oscillating heat pipe comprises forming the array of channels to comprise a series of concentric circles of channels, wherein the first end of the array of channels comprises a radially inward portion of the array of channels, wherein the second end of the array of channels comprises a radially outward portion of the array of channels.

8. The method of claim 1, wherein a material of the body comprises a metal.

9. The method of claim 8, wherein the additive manufacturing process comprises a directed energy deposition or a powder bed fusion process.

10. The method of claim 8, wherein the additive manufacturing process comprises a fused filament fabrication, a photopolymerization, or a powder sintering process.

11. The method of claim 1, wherein a material of the body comprises a polymer.

12. The method of claim 11, wherein the material of the body comprises an optically transparent, an optically, translucent, or an optically opaque polymer material.

\* \* \* \* \*